(12) United States Patent
Bastide et al.

(10) Patent No.: US 10,210,193 B2
(45) Date of Patent: *Feb. 19, 2019

(54) INGESTION PLAN BASED ON TABLE UNIQUENESS

(71) Applicant: International Business Machines Corporation, Armonk, NY (US)

(72) Inventors: Paul R. Bastide, Boxford, MA (US); Matthew E. Broomhall, Goffstown, NH (US); Donna K. Byron, Petersham, MA (US); Robert E. Loredo, North Miami Beach, FL (US); Alexander Pikovsky, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/623,494

(22) Filed: Jun. 15, 2017

(65) Prior Publication Data

US 2017/0277734 A1  Sep. 28, 2017

Related U.S. Application Data

(63) Continuation of application No. 15/140,976, filed on Apr. 28, 2016, now Pat. No. 9,720,945, which is a
(Continued)

(51) Int. Cl.
*G06F 17/30* (2006.01)
*G06K 9/00* (2006.01)
*G06K 9/62* (2006.01)

(52) U.S. Cl.
CPC .. *G06F 17/30321* (2013.01); *G06F 17/30011* (2013.01); *G06K 9/00449* (2013.01);
(Continued)

(58) Field of Classification Search
None
See application file for complete search history.

(56) References Cited

U.S. PATENT DOCUMENTS 4,965,763 A  10/1990  Zamora
5,893,092 A   4/1999  Driscoll
(Continued)

OTHER PUBLICATIONS

IBM: List of IBM Patents or Patent Applications Treated As Related (Appendix P), Jul. 18, 2017, 2 pages.
(Continued)

*Primary Examiner* — Belix M Ortiz Ditren
(74) *Attorney, Agent, or Firm* — L. Jeffrey Kelly

(57) ABSTRACT

Embodiments of the present invention disclose a computer program product for processing tabular data. In various embodiments, an electronic document is received through a network, along with associated metadata. A plurality of table markers, or tabular data markers, are identified, in response to analyzing the received electronic document for said markers. References and citations associated with the plurality of tabular data markers are identified. A graphical representation of the relationship between identified tabular data markers and the identified references is generated. A uniqueness score is calculated, based on the generated graph and an ingestion plan is generated for the received electronic documents based on the calculated uniqueness score value.

1 Claim, 4 Drawing Sheets

Related U.S. Application Data continuation of application No. 14/933,020, filed on Nov. 5, 2015, now Pat. No. 9,679,198.

(52) U.S. Cl.
CPC ..... *G06K 9/00456* (2013.01); *G06K 9/00463* (2013.01); *G06K 9/00469* (2013.01); *G06K 9/6224* (2013.01)

(56) References Cited

U.S. PATENT DOCUMENTS

| | | | |
|---|---|---|---|
| 7,697,155 | B2 | 4/2010 | Ikegami et al. |
| 7,792,829 | B2 | 9/2010 | Brill et al. |
| 8,010,905 | B2 | 8/2011 | Ryan et al. |
| 8,090,717 | B1 | 1/2012 | Bharat et al. |
| 8,412,718 | B1 | 4/2013 | Bilger |
| 8,756,229 | B2 | 6/2014 | Stockton et al. |
| 8,756,236 | B1 | 6/2014 | Procopio et al. |
| 8,984,433 | B2 | 3/2015 | Martone et al. |
| 9,251,413 | B2 | 2/2016 | Meter et al. |
| 2012/0191716 | A1 | 7/2012 | Omoigui |
| 2015/0169737 | A1 | 6/2015 | Byron et al. |
| 2015/0309990 | A1 | 10/2015 | Allen et al. |
| 2015/0317561 | A1 | 11/2015 | Allen et al. |
| 2017/0132258 | A1 | 5/2017 | Bastide et al. |

OTHER PUBLICATIONS

Pending U.S. Appl. No. 15/623,518, filed Jun. 15, 2017, entitled: "Ingestion Plan Based on Table Uniqueness", 25 pages.

United States Department of Commerce, Bureau of the Census, "Histroical Statistics of the United States 1789-1945", Jun. 1949, pp. 1-363.

Li et al., "Towards Fine-grained Citation Function Classification", Proceedings of Recent Advances in Natural Language Processing, pp. 402-407, Hissar, Bulgaria, Sep. 7-13, 2013.

Apache, "ODFDOM—The Opendocument API", Apache Incubator, http://incubator.apache.org/odftoolkit/odfdom/index.html, © 2011, pp. 1-2.

Oliver et al., "Apache POI—the Java API for Microsoft Documents", Project News, Dec. 21, 2014—POI 3.11 available, pp. 1-2.

Microsoft, "Tools to Get Work Done", Microsoft Office © 2015, pp. 1-5, https://products.office.com/en-US/.

Oracle®, "Oracle Outside in Technology", © 2014, pp. 1-3.

IBM, "SPSS Text Analytics for Surveys", http://www-03.ibm.com/software/products/en/spss-text-analytics-surveys, printed on Feb. 27, 2015, pp. 1-2.

IBM, "SPSS Statistics", http://www-01.ibm.com/software/analytics/spss/products/statistics/, printed on Feb. 27, 2015, pp. 1-2.

Wikiped1a, "Natural language processing", printed on Feb. 27, 2015, http://en.wikipedia.org/wiki/Natural_language_processing, pp. 1-11.

Apache, "Apache PDFBox—A Java PDF Library", https://pdfbox.apache.org/, printed on Feb. 27, 2015, pp. 1-2.

Wikipedia, the free Encyclopedia, "United States Census", http://en.wikipedia.org/wiki/United_States_Census, this page was last modified on Oct. 21, 2015, p. 1.

Information Processing Society of Japan/Japanese Information Technology Standards Commission of Japan, https://www.itscj.ipsj.or.jp/itscj_english/index.html, © 2000, p. 1.

INGESTION PLAN BASED ON TABLE UNIQUENESS

BACKGROUND

The present invention relates generally to the field of table ingestion from documents, and more particularly to the optimization of the ingestion of tables from a document using data and metadata analysis to determine uniqueness.

Data analytics examines data in order to draw conclusions about the analyzed information. Data is commonly presented in tables and may make direct analysis more complex. For many domains such as science, medicine, and finance, context for tables may be as critical to understanding the data as the data itself. Difficulty in processing, or ingestion, tables may come from a document or set of documents containing tables with various formats or styles. Tables analyzed using Optical Character Recognition (OCR), or Object Linking and Embedding (OLE), may contain errors in the data conversion.

Ingestion of well-defined HTML tabular data may be less costly and resource intensive than the ingestion of a pictorial table ingested via OCR extraction. If there is a document with a combination of formats, an ingestion system may need to defer to the well-defined tabular data to ensure quality, wherein this may not yield the most desirable information, as a table with a less common or less well-defined formatting may contain desirable information within the context of the document.

SUMMARY

It would be advantageous to have an ingestion plan for tabular data that identifies high value data, regardless of format or error potential, before ingestion. Embodiments of the present invention disclose a computer program product for processing tabular data. In various embodiments, an electronic document is received through a network, along with associated metadata. A plurality of table markers, or tabular data markers, are identified, in response to analyzing the received electronic document for said markers. References and citations associated with the plurality of tabular data markers are identified. A graphical representation of the relationship between identified tabular data markers and the identified references is generated. A uniqueness score is calculated, based on the generated graph and an ingestion plan is generated for the received electronic documents based on the calculated uniqueness score value.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

DETAILED DESCRIPTION

Figure 1:
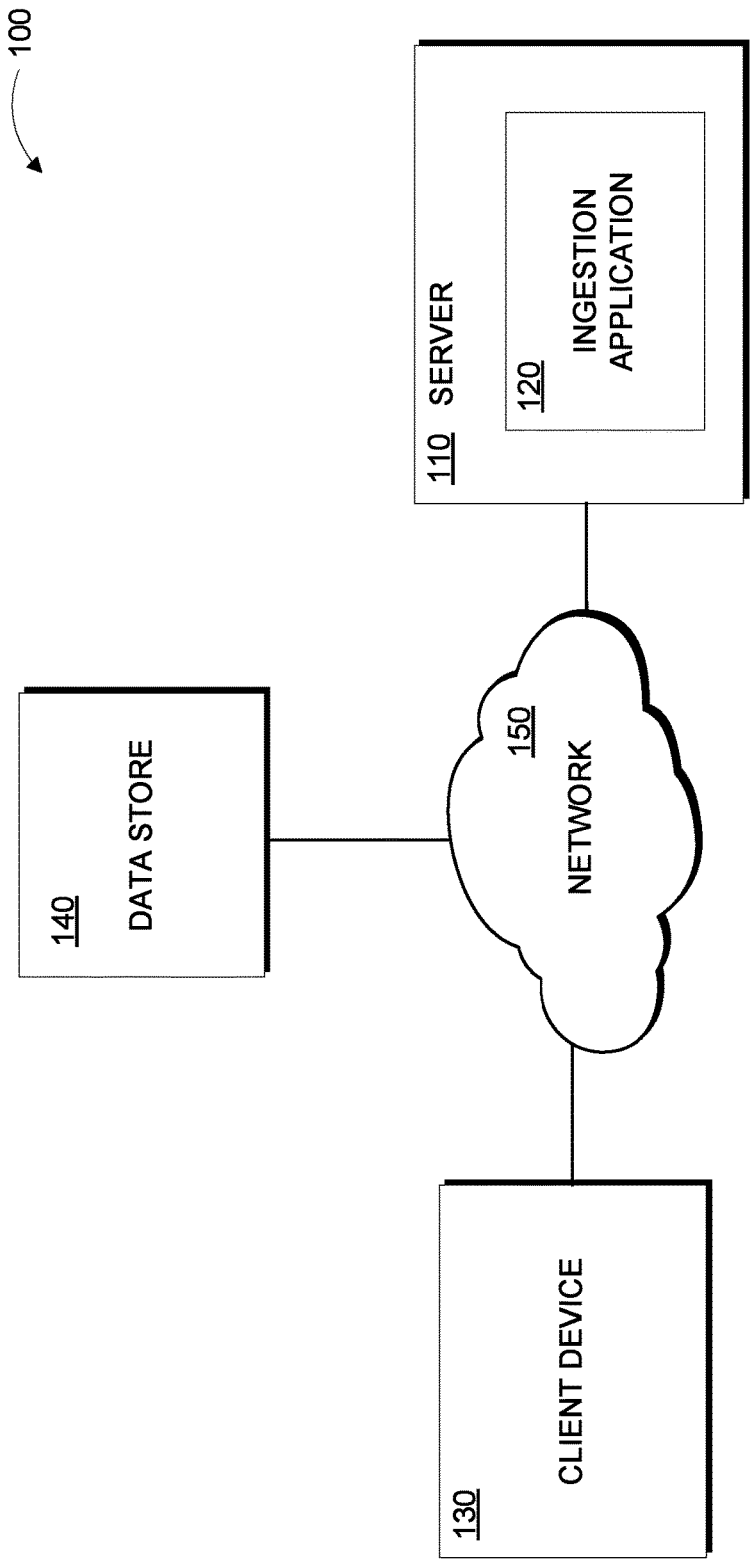
FIG. 1 is a functional block diagram illustrating a distributed data processing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With increasing data consumption, organization of data in tables may become more prevalent. As data consumed for organization, for example, via a server, and stores data, for example, in a database, the organization of consumed data may become more time and resource intensive. Organization of consumed data may be more efficient using data tables and it may be advantageous to engage in a system for prioritizing table and associated data by the importance of the data, as in various embodiments of the present invention.

Information may become more cloud based, and various formats, styles, file types, etc. may be used to represent data in tables. Increases in data may increase the time and resources needed for the analytics of tabular data. Traditional techniques of tabular data extraction using OCR or natural language processing may be time, cost, or computer resource prohibitive. It would be advantageous to go beyond data extraction to optimize and prioritize high value tables with unique data that can minimize redundant extraction and processing.

Embodiments of the present invention may utilize a query answering system that may identify structured information in received tabular data in documents. The tabular data may be analyzed to identify and analyze references and/or citations within the document referring to the tabular data. The number of references may correspond to a predetermined uniqueness criteria which may be used to determine an ingestion plan for the tables identified within the received documentation. Depending on a user's desired data the ingestion plan may be modified.

Embodiments of the present invention will be described with reference to the Figures. Referring to FIG. 1, a general distributed data processing environment 100 is illustrated, in accordance with an embodiment of the present invention. Distributed data processing environment 100 includes server 110, client device 130, and data store 140, all interconnected over network 150.

Network 150 may include permanent connections, such as wire or fiber optic cables, or temporary connections made through telephone or wireless communications. Network 150 may represent a worldwide collection of networks and gateways, such as the Internet, that use various protocols to communicate with one another, such as Lightweight Directory Access Protocol (LDAP), Transport Control Protocol/

Internet Protocol (TCP/IP), Hypertext Transport Protocol (HTTP), Wireless Application Protocol (WAP), etc. Network 150 may also include a number of different types of networks, such as, for example, an intranet, a local area network (LAN), or a wide area network (WAN).

Each of server 110 and client device 130 may be a laptop computer, tablet computer, netbook computer, personal computer (PC), desktop computer, smart phone, or any programmable electronic device capable of an exchange of data packets with other electronic devices, for example, through a network adapter, in accordance with an embodiment of the invention, and which may be described generally with respect to FIG. 4 below. In various embodiments, server 110 may be a separate server or series of servers, a database, or other data storage, internal or external to client device 130. Data store 140 may be any computer readable storage media accessible via network 150. Data store 140 may index received electronic documents to be communicated to client device 130, in accordance with an embodiment of the invention.

Client device 130 may act generally to host an application, capable of display in a graphical user interface, or GUI, or communicate over a network, for example network 150, via a web browser. In various embodiments of the invention, client device 130 may act generally to receive input from a user, communicate user input to data store 140 for further processing, and communicate with server 110 over a network 150.

Client device 130 may be able to communicate with server 110 and data store 140 over network 150. Client device 130 may receive documents, tabular data, user inputs, analytics outputs, or other communications from server 110 or data store 140, as described below, in accordance with an embodiment of the present invention. In various embodiments, client device 130 may display electronic documents, tables, ingestion plans, or other information to a user in a GUI and receive input to annotate one or more parts of the GUI in an interactive manner. For example, an interactive selection tool may be provided to the user to allow the user to select one or more graphical representations of analytics, described in more detail below. The user may make a selection through clicking an input device, for example, a mouse, or any appropriate manner of gestures, touches, combined keys, or any other means of interactive input with the client device 130, as described in FIG. 4.

Figure 2:
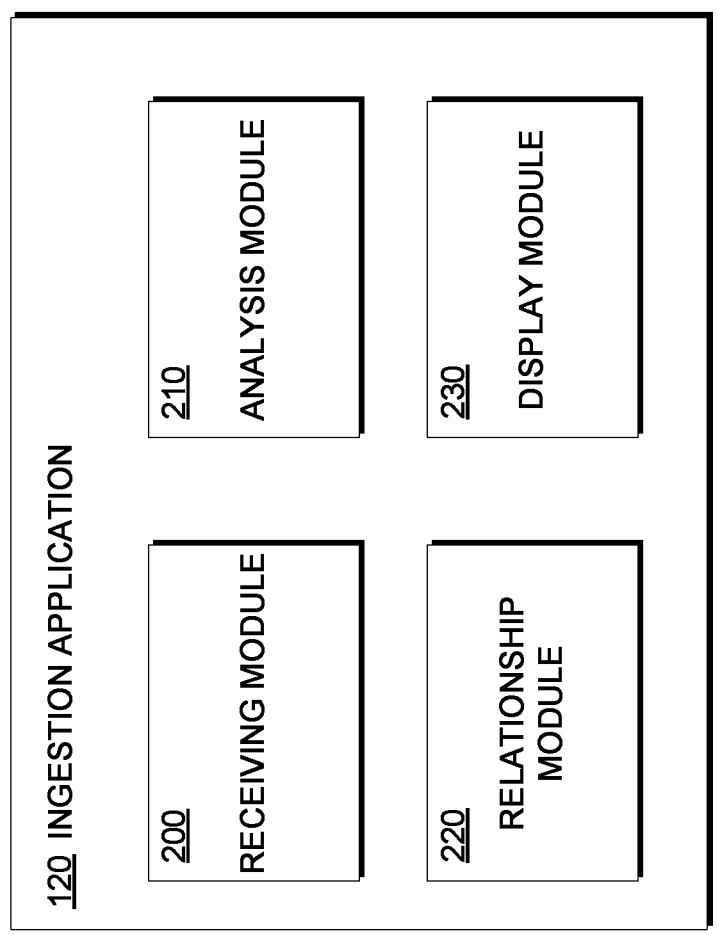
FIG. 2 is a functional block diagram illustrating the components of an application within the distributed data processing environment, in accordance with an embodiment of the present invention.

Server 110 includes ingestion application 120, as described in more detail in reference to FIG. 2. In various embodiments, server 110 operates generally to receive inputs, process a set of received electronic documents based on the received inputs, communicate analysis results, for example, ingestion plans, for display to a user device, for example client device 130, and host applications, for example ingestion application 120, which may process and/or store data.

Ingestion application 120 may be, for example, database oriented, computation oriented, or a combination of these. Ingestion application 120 may operate generally to receive and process electronic documents from a client device, for example, client device 130. Received documents may contain tabular data of various formats, for example, XML, HTML, PDF, various pictorial data, etc.

Ingestion application 120 may receive a set of documents from client device 130 or data store 140. Ingestion application 120 may analyze the received document or set of documents in order to extract any tabular data within the document(s). Received documents may include metadata that identifies the provenance information for each corresponding document, for example, the source URL, title, author(s), publication information, etc. Extracted tabular data may be indexed or stored in a data store in memory for later processing. Ingestion application 120 may analyze the non-tabular data of the documents in order to determine if there is any references, citations, identifying metadata, authorship information, etc., or generally "references," which correspond to the extracted tabular data. Ingestion application 120 may generate a relationship graph based on the tabular data and references in which the tables are vertices and the documents are edges, where, the number of references affect amplitude. Ingestion application 120 may analyze the relationship graph and determine a uniqueness score based on the relationship graph. Ingestion application 120 may display tabular data, above a predetermined uniqueness score, to a user or generate an ingestion plan based on the uniqueness score.

Referring to FIG. 2, FIG. 2 is a functional block diagram illustrating the components of ingestion application 120 within the distributed data processing environment 100 of FIG. 1. Ingestion application 120 includes receiving module 200, analysis module 210, relationship module 220, and display module 230.

In reference to FIGS. 1 and 2, receiving module 200 may act generally to receive inputs from and/or a document or sets of documents from a device, for example, client device 130 or data store 140. In an embodiment of the present invention, receiving module 200 may receive a document, for example an article about the United States Census, and provenance information, for example, embedded links, source URL, and other metadata, along with a query, or other instruction, from a user for an ingestion plan for the United State Census article. The query may include a uniqueness threshold value that may be communicated to relationship module 220, described in greater detail below. Receiving module 200 may communicate the received document or set of documents, and provenance data, to analysis module 210 for further processing or store the received document or set of documents in a data store.

Analysis module 210 may act generally to analyze received documents, search received documents in order to identify table markers associated with tabular data within the received document, and analyze the received provenance data for references, citations, identifying metadata, authorship information, etc, or "references" associated with the identified table markers.

Analysis module 210 may use traditional techniques to load documents in memory, for example, Apache POI, Apache UIMA, Apache ODFDOM, OCR, or other methods. Analysis module 210 may identify table markers by searching for HTML based document markers, for example, <TABLE>, or other formats which has a designated tabular structure. For example, OOXML data may be embedded in XML format or in OLE tables which can be identified by the following example:

```
<table xmlns="http://purl.oclc.org/ooxml/spreadsheetml/main" id="1"
name="MarginTable" displayName="MarginTable" ref="D3:G6"
totalsRowShown="0">
</table>
```

In an additional example, analysis module 210 may receive a PDF document and use common spacing, headers, breaks, structured columns, or other borders to identify tables within the document. Analysis module 210 may communicate index identified tabular data and associated references, along with the corresponding document, to be stored in memory or communicated to relationship module 220 for further processing.

Relationship module 220 may act generally to generate a relationship graph based on received tabular data, document, and references. The generated relationship graph may include tabular data as vertices, documents as edges, where the edges are directional indicating a reference to tabular data. In an embodiment, edges may be annotated, for example with column or row labels in pivot format. It can be appreciated that the relationship graph described above is merely exemplary and other graphical formats may be used to demonstrate the relationship between the tabular data and associated references graphically.

In various embodiments, user delay or resource limitations may prevent a full document from being communicated to relationship module 220 before the relationship graph is generated. If tabular data or a reference is added to the relationship graph and the corresponding document has not been loaded a provisional edge or vertex may be added to the relationship graph represented a potential associated document and contain an indicative label as provisional.

In an embodiment relationship module 220 may analyze the relationship graph based on the topology sorts, edge threshold, or graph density, in order to determine a uniqueness score. A uniqueness score may be calculated based on: the number of inbound directional edges to a vertex or specific reference (topological uniqueness score); a predetermined threshold of outgoing edges in order to determine if tabular data is unique or not relative to other tabular data (edge threshold uniqueness score); or a predetermined threshold number of vertexes indicating a cluster of related tabular data (graph density uniqueness score). In various embodiments a uniqueness score may be associated with tabular data and may indicate value or importance to a user. Relationship module 220 may communicate tabular data and the associated uniqueness score to display module 230 for display to a user, for example, via client device 130.

In various embodiments, the uniqueness score associated with tabular data may be increased or decreased (weighted) based on secondary factors, for example, overlapping or repetitive tabular data or metadata within a document. Relationship module 220 may generate an ingestion plan based on the uniqueness score associated with tabular data which may be communicated to display module 230.

Display module 230 may act generally to communicate generated relationship graphs, ingestion plans, or tabular data, to be displayed to client device 130, through network 150, and receive input from a user via client device 130. Display module 230 may receive communications from relationship module 220, for example, a relationship graph communicated from relationship module 220. In various embodiments, display module 230 may receive user input, for example, selecting tabular data for ingestion or a uniqueness score threshold, which may be communicated to relationship module 220.

Figure 3:
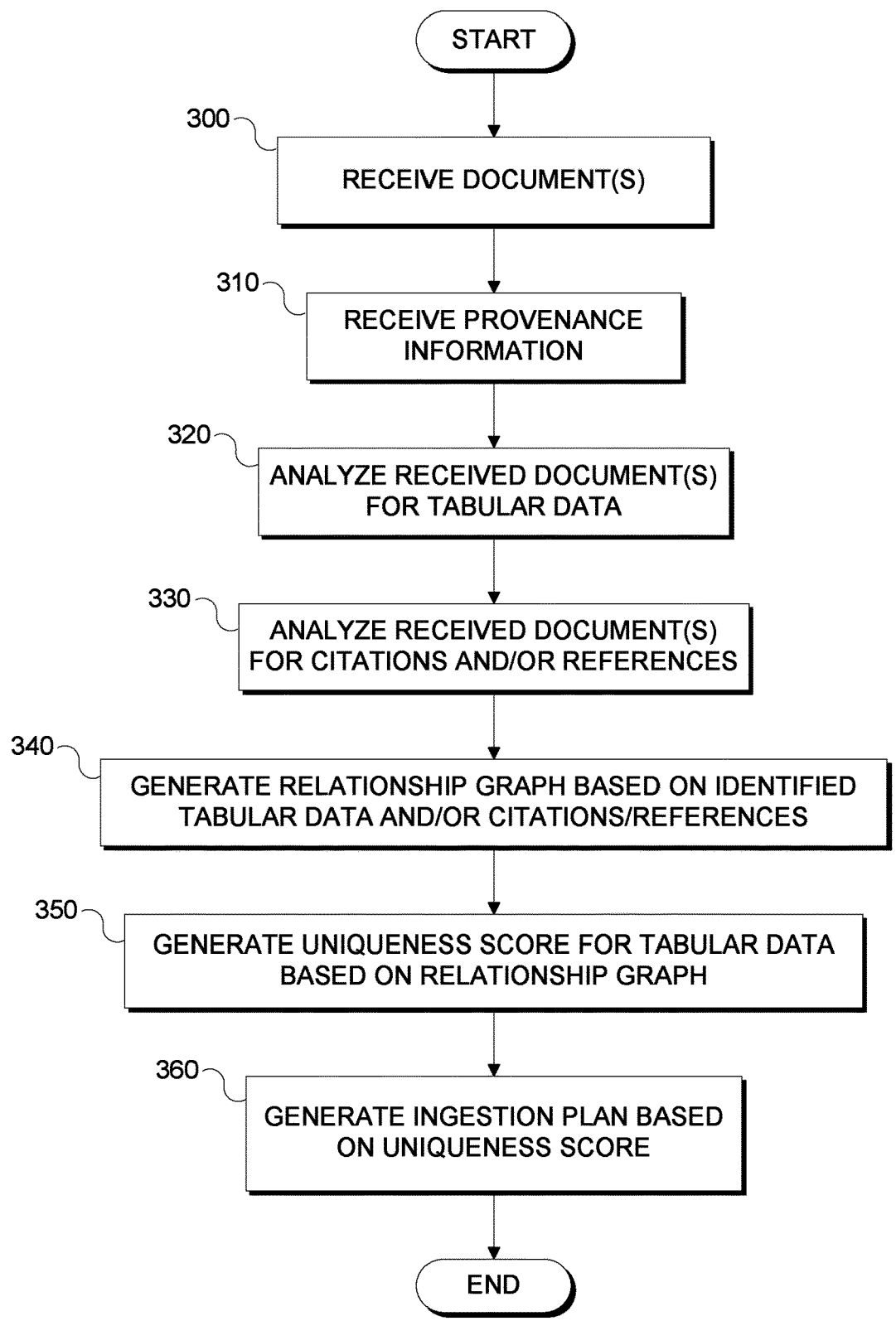
FIG. 3 is a flowchart depicting operational steps of an ingestion application, on a server computer within the data processing environment of FIG. 1, in accordance with an embodiment of the present invention.

FIG. 3 is a flowchart depicting operational steps of ingestion application 120, on a server computer within the data processing environment of FIG. 1, in accordance with an embodiment of the present invention. Referring now to FIGS. 1, 2, and 3, in step 300, receiving module 200 receives documents from a client device, for example, client device 130, or a data store, for example, data store 140, via server 110. The documents may be in electronic format, for example, HTML, XML, or OCR extracted.

In step 310, receiving module 200 receives provenance information associated with the received documents. Provenance information may include source URL's for the documents, the authorship information, author(s), the title, publication information, or other metadata associated with the received document. In various embodiments the documents and provenance data may be indexed and stored in a data store.

Receiving module 200 communicates the received documents and provenance data, if available, to the analysis module 210 which analyzes the documents, in step 320, and identifies tabular markers in order to identify tabular data within the received documents. Analysis module 210 analysis the document and provenance data for references or citations related to the identified tabular data, in step 330. References can come from table of contents, table of tables, title information from the provenance metadata, or version dates to identify the most recent tabular data. In various embodiments natural language searches may be performed in order to identify and categorize the uses of identified tabular data, or identify textual context for the tabular data, for example, differentiating data tables contained within sections of the document identified as "prior art" or "related background" vs. sections of the document identified as "Experiments" or "Findings". Natural language analysis may also be used to identify statements within the document referencing the tabular data, for example, "Our findings are shown in the above table X."

Analysis module 210 communicates documents, identified tabular data, and identified references to relationship module 220 and, in step 340, relationship module 220 generates a relationship graph based on the received documents, tabular data, and references. As described above, in various embodiments, tabular data is used as vertices, documents are edges, and the references are directional edges.

Relationship module 220 generates a uniqueness score for the tabular data based on the relationship graph in step 350. As described above the uniqueness score may be based on the number of inbound directional edges to a vertex or specific reference, a predetermined threshold of outgoing edges in order to determine if tabular data is unique or not relative to other tabular data, or a predetermined threshold number of vertexes indicating a cluster of related tabular data. A uniqueness score may be weighted based on the number of references in a document associated with tabular data.

In step 360, relationship module 220 generates an ingestion plan based on the calculated uniqueness score. In various embodiments relationship module 220 communicates the ingestion plan to display module 230 for display to a user, as described above. In additional embodiments, relationship module 220 may store the ingestion plan in a data or communicate with a module or application within server 110 and process the tabular data based on the generated ingestion plan.

Figure 4:
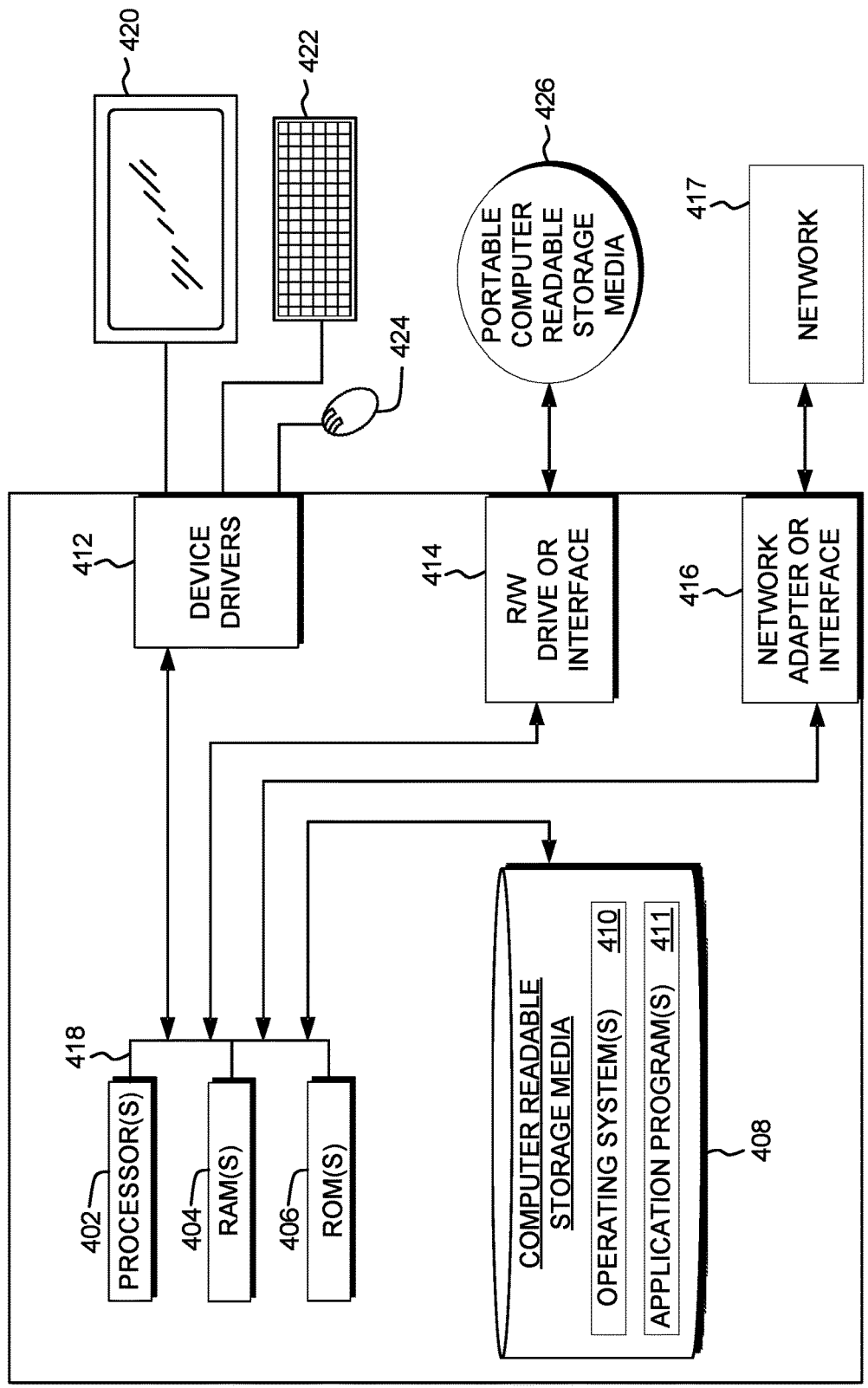
FIG. 4 depicts a block diagram of components of the server computer executing the ingestion application, in accordance with an embodiment of the present invention.

Referring to FIG. 4, FIG. 4 depicts a block diagram of components of server 110 and client device 130 FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server 110 and client device 130 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, ingestion application 120, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 and client device 130 may also include a R/W drive or interface 414 to read from and write to one or more portable computer readable storage media 426. Application programs 411 on server 110 and client device 130 may be stored on one or more of the portable computer readable storage media 426, read via the respective R/W drive or interface 414 and loaded into the respective computer readable storage media 408.

Server 110 and client device 130 may also include a network adapter or interface 416, such as a TCP/IP adapter card or wireless communication adapter (such as a 4G wireless communication adapter using OFDMA technology) for connection to a network 417. Application programs 411 on server 110 and client device 130 may be downloaded to a computing device, for example, server 110, from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 110 and client device 130 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented computer program for document processing, the computer program product comprising:
one or more computer-readable storage media and program instructions stored on the one or more computer-readable storage media, the program instructions comprising:
program instructions to receive a plurality of electronic documents on a computer through a network, the plurality of electronic documents being stored on a remote server, the network being an internet connection;
program instructions to receive a plurality of metadata from the remote server through the network, the metadata being a plurality of identifying information associated with the received plurality of electronic documents;
program instructions to index the received plurality of electronic documents and the received plurality of metadata in a data store;
program instructions to identify a plurality of tabular data markers, in response to analyzing the received electronic document and associated metadata;
program instructions to identify references for association with the identified plurality of tabular data markers by natural language analysis;
program instructions to generate a graphical representation of the relationship between the identified tabular data markers and identified references, the graphical representation comprising a plurality of inbound directional edges and a plurality of vertices, wherein the directional edges are based on the identified references having an amplitude based on a count of identified references, and the vertices of the plurality of vertices are tabular data of the identified references;
program instructions to calculate a uniqueness score value based on the generated graphical representation, the uniqueness score comprising a first value based on the plurality of inbound directional edges and a second value based on the plurality of vertices;
program instructions to modify the calculated uniqueness score based on one or more of:
a first count based on the directional edges to a vertex in the graphical representation;
program instructions to multiply the uniqueness score by zero, in response to the count of direction edges not exceeding a threshold; and
in response to input by a user, a second count based on the of vertexes in the graphical representation exceeding a threshold; and
program instructions to generate an ingestion plan for the received electronic documents for display based on the calculated uniqueness score value, the ingestion plan comprising an ordered list of the received plurality of electronic documents.

* * * * *